Jan. 30, 1923.

C. W. SPICER ET AL.
FLEXIBLE COUPLING.
FILED JULY 14, 1921.

1,443,440.

Inventors
C. W. SPICER
G. L. TARBOX
By their Attorneys
Sheffield & Betts

Patented Jan. 30, 1923.

1,443,440

UNITED STATES PATENT OFFICE.

CLARENCE W. SPICER AND GURDON L. TARBOX, OF PLAINFIELD, NEW JERSEY, ASSIGNORS TO SPICER MFG. CORPORATION, OF SOUTH PLAINFIELD, NEW JERSEY, A CORPORATION OF VIRGINIA.

FLEXIBLE COUPLING.

Application filed July 14, 1921. Serial No. 484,664.

*To all whom it may concern:*

Be it known that we, CLARENCE W. SPICER and GURDON L. TARBOX, both citizens of the United States, residing at Plainfield, in the county of Union, State of New Jersey, have invented certain new and useful Improvements in Flexible Couplings, of which the following is a disclosure.

Our invention relates to flexible couplings such as are employed to connect rotatable power shafts of all kinds, and particularly to couplings for connecting the power shafts of automobiles, and is an improvement on the flexible coupling described in the application of Gurdon L. Tarbox, Serial No. 435,919, filed January 8, 1921. In said application there is described a flexible coupling comprising two hub members each bearing a series of fixed projections with resilient members preferably of rubber interposed between the projections and which operate to flexibly connect the two parts of the coupling. The improved device now claimed differs from that of said application in that it comprises, in addition to the hub members with projections, a third or housing member which also bears a series of projections. The projections on the housing member alternate with the projections on the hub, and the resilient members are disposed between the projections on the hubs and the projections on the housing. In the improved arrangement the housing is free from both of the hubs, and this changes the rolling action of the balls so that less ball movement is required for a given angle than in the prior arrangement. Also in the improved arrangement greater longitudinal movement may be had and the balls are not required to have so high a degree of elasticity, and in some cases where only a limited amount of flexibility is required balls of steel or of other material having only a slight amount of elasticity may be employed.

Our invention with other advantages will, with the foregoing explanation, be readily understood from a description of the preferred embodiment shown in the drawing accompanying and forming a part of this specification and in which—

Figure 1:
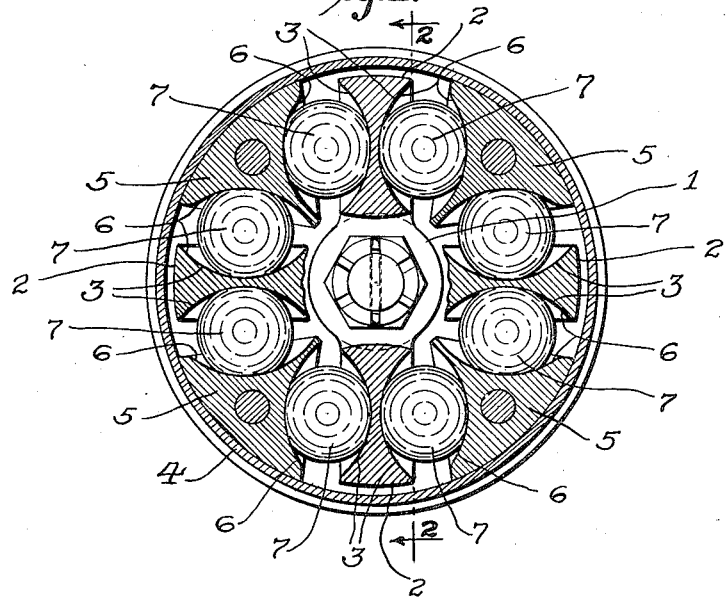
Fig. 1 is a transverse section of the joint.
Figure 2:
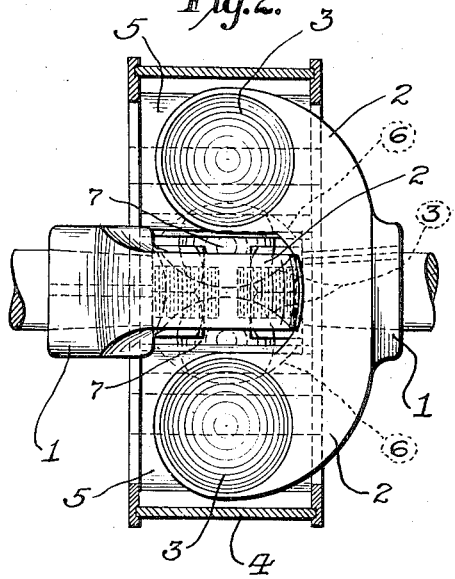
Fig. 2 is a longitudinal section taken on the line 2—2 of Fig. 1.
Figure 3:
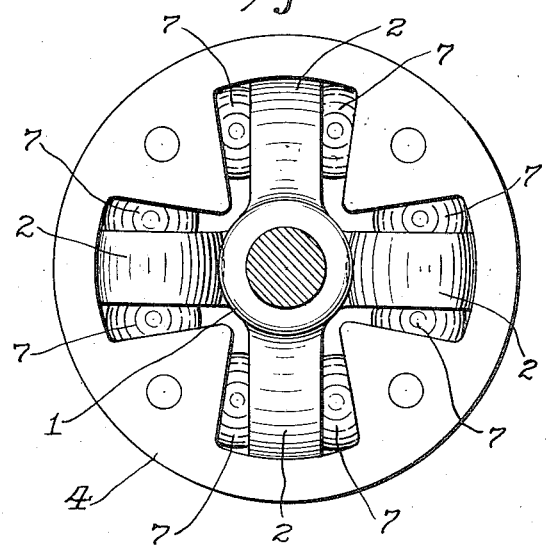
Fig. 3 is an end view of the structure shown in Fig. 2.

Referring in detail to the structure illustrated, the joint comprises two oppositely disposed hub members 1, each carrying arms or projections 2. These arms or projections have bowl shaped cavities 3 formed on their faces. A housing 4 surrounds the joint and on the interior of this housing there are fixed a plurality of projections 5 which also have bowl shaped cavities on their opposite faces as indicated at 6. The projections on the housing alternate and are disposed between the projections 2 on the hub members so that the balls 7, of rubber, rubber compounds or other resilient material, when disposed between the projections on the housing and the projections on the arms will function to flexibly connect the two parts of the coupling and will, owing to their flexibility and to their rolling action in the bowl-shaped cavities, permit the joint to operate at considerable angles. These rubber balls are preferably inserted and maintained under substantial compression so that they remain in place and securely hold the joint together.

In addition to the advantages above referred to which are peculiar to this improved joint, it has all the advantages of the joint described in the Tarbox application above referred to, that is to say, it minimizes the transmission of noises and vibrations originating in one shaft or a part to the other, and it will yield in the direction of rotation and thus take up sudden jars or strains and is durable and can be made comparatively small in size.

Although we have described only the preferred embodiment of our invention, we are aware that various modifications may be made by those skilled in the art, and we desire protection for all such modifications as come within the scope of our claim. For example, it is obvious that the number of projections on the arms and the housing may be varied as desired and the invention is not restricted to the use of any particular number of projections. Where the specification refers to the use of rubber we intend to include compounds of rubber and also other materials having similar properties.

What we claim is:

A flexible shaft coupling comprising two hub members and a housing member, a plurality of projections on each member, the projections on the housing member being disposed between the projections on the hubs, bowl shaped cavities formed on the adjacent faces of the projections and balls of rubber or similar material disposed in said cavities and operating to flexibly connect the two parts of the coupling.

CLARENCE W. SPICER.
GURDON L. TARBOX.